(12) United States Patent
Krapf et al.

(10) Patent No.: US 10,920,823 B2
(45) Date of Patent: Feb. 16, 2021

(54) SEALING ARRANGEMENT FOR A WHEEL BEARING

(71) Applicant: SCHAEFFLER TECHNOLOGIES AG & CO. KG, Herzogenaurach (DE)

(72) Inventors: Marco Krapf, Burkardroth (DE); Alexander Häpp, Hofheim/Lendershausen (DE); Andreas Kaiser, Werneck (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/606,557

(22) PCT Filed: Jan. 18, 2018

(86) PCT No.: PCT/DE2018/100041
§ 371 (c)(1),
(2) Date: Oct. 18, 2019

(87) PCT Pub. No.: WO2018/192597
PCT Pub. Date: Oct. 25, 2018

(65) Prior Publication Data
US 2020/0056652 A1 Feb. 20, 2020

(30) Foreign Application Priority Data
Apr. 20, 2017 (DE) ...................... 10 2017 108 386.3

(51) Int. Cl.
*F16C 33/76* (2006.01)
*F16C 19/00* (2006.01)
(Continued)

(52) U.S. Cl.
CPC ............ *F16C 19/00* (2013.01); *F16C 33/586* (2013.01); *F16C 33/768* (2013.01); *F16C 33/783* (2013.01);
(Continued)

(58) Field of Classification Search
CPC .. F16C 33/783; F16C 33/7886; F16C 33/805; F16C 2326/02
See application file for complete search history.

(56) References Cited

U.S. PATENT DOCUMENTS 8,863,712 B2  10/2014  Schafer et al.
9,206,713 B2  12/2015  Schafer et al.
(Continued)

FOREIGN PATENT DOCUMENTS

DE          10358876 A1    7/2005
DE      102006047014 A1    4/2007
(Continued)

*Primary Examiner* — Phillip A Johnson
(74) *Attorney, Agent, or Firm* — Brooks Kushman P.C.

(57) ABSTRACT

A sealing arrangement for a wheel bearing having a first bearing part and a second bearing part integrally connected to a wheel bearing flange, between which rolling elements are guided, wherein the sealing arrangement has a carrier element which is connected to the first bearing part and wherein a resilient element is provided on the carrier element, wherein the resilient element has at least one sealing lip, and the carrier element has a fastening portion which is connected to an outer circumference of the first bearing part, wherein a sealing ring which forms a seal for the fastening portion is formed on the resilient element, wherein the sealing ring has a cylindrical circumferential surface which abuts the external circumference of the first bearing part.

14 Claims, 2 Drawing Sheets

(51) Int. Cl.
  *F16C 33/58*   (2006.01)
  *F16C 33/78*   (2006.01)
  *F16C 33/80*   (2006.01)
(52) U.S. Cl.
  CPC ........ *F16C 33/805* (2013.01); *F16C 2326/02* (2013.01)

(56) References Cited

U.S. PATENT DOCUMENTS

| | | | |
|---|---|---|---|
| 2007/0147718 A1* | 6/2007 | Takimoto | F16C 33/7886 384/486 |
| 2013/0127119 A1* | 5/2013 | Haepp | F16C 33/7863 277/351 |
| 2013/0241270 A1 | 9/2013 | Morita | |
| 2016/0003302 A1 | 1/2016 | Seno et al. | |
| 2016/0221391 A1* | 8/2016 | Lim | F16C 33/805 |
| 2017/0284470 A1* | 10/2017 | Wollert | F16C 33/805 |
| 2018/0066711 A1* | 3/2018 | Wakabayashi | F16C 33/7876 |
| 2018/0186181 A1* | 7/2018 | Tada | F16J 15/3264 |

FOREIGN PATENT DOCUMENTS

| | | |
|---|---|---|
| DE | 102009052311 A | 5/2011 |
| DE | 102010034385 A1 | 2/2012 |
| DE | 102013217299 A1 | 3/2015 |
| DE | 102013218635 A1 | 3/2015 |
| DE | 102013220074 A1 | 4/2015 |
| DE | 102014206761 A1 | 10/2015 |
| DE | 102015122596 A1 | 8/2016 |
| EP | 2639468 A2 | 9/2013 |
| JP | 2006118553 A | 5/2006 |
| JP | 2010210085 A | 9/2010 |
| KR | 20130087855 A | 8/2013 |

* cited by examiner

SEALING ARRANGEMENT FOR A WHEEL BEARING

CROSS-REFERENCE TO RELATED APPLICATIONS

This application is the U.S. National Phase of PCT/DE2018/100041 filed Jan. 18, 2018, which claims priority to DE 10 2017 108 386.3 filed Apr. 20, 2017, the disclosures of which are hereby incorporated in their entirety by reference herein.

TECHNICAL FIELD

The disclosure relates to a seal arrangement of a wheel bearing.

BACKGROUND

In order to achieve a long service life, wheel bearings of vehicles require sealing means on both sides of the interior space which is filled with a lubricant and contains rolling bodies. To this end, inter alia, flinger plates are used which form a sealing labyrinth with sealing lips.

DE 10 2010 034 385 A1 has disclosed a bearing seal for wheel bearings, in the case of which bearing seal a finger plate is fixed on a wheel bearing flange which is connected in one piece to a rotating bearing ring of the wheel bearing. Sealing lips of a seal arrangement which is coupled to the further rotationally locked bearing ring are supported on the flinger plate.

DE 10 2009 052 311 A1 has described a wheel bearing having a seal arrangement, which wheel bearing encloses a flinger ring on the flange side for sealing the anti-friction bearing. In the installed state, axial sealing lips are supported via sliding sealing contacts on the flinger plate. The sealing lips are assigned to a carrier which is fastened to an outer ring.

DE 103 58 876 A1 has disclosed a seal arrangement for wheel bearings, which seal arrangement is arranged by means of two sealing rings in an axial opening between the two parts of the wheel bearing which can be rotated relative to one another, and seals the wheel bearing axially. To this end, the two sealing rings form a gap labyrinth which has a collection channel with a sealing gap which opens axially and extends radially.

SUMMARY

It is an object of the present disclosure to provide a seal arrangement which has a reliable sealing action over the operating life and has an increased service life.

According to one embodiment, a seal arrangement of a wheel bearing is provided, having a first bearing part and a second bearing part which is connected in one piece to a wheel bearing flange, between which bearing parts rolling bodies are guided, the seal arrangement having a carrier element which is connected to the first bearing part, and an elastic element being provided on the carrier element, the elastic element having at least one sealing lip, and the carrier element having a fastening section which is connected to an outer circumference of the first bearing part, a sealing ring which forms a sealing means of the fastening section being integrally formed on the elastic element, the sealing ring having a cylindrically circumferential face which bears against the outer circumference of the first bearing part.

In the case of known seal arrangements, the sealing ring typically has a lug which is of circumferential configuration and bears against the outer circumference of the first bearing part. A linear contact of the sealing ring on the seat is produced as a result. As a consequence, a low overlap ratio between the sealing ring and the first bearing part is produced, as a result of which folding over of the sealing ring can occur during assembly.

Therefore, the seal arrangement according to this disclosure has a sealing ring which has a cylindrically circumferential face which bears against the outer circumference of the first bearing part. This makes a full surface area contact of the sealing ring with the seat possible, as a result of which the overlap ratio is improved. It is advantageous that folding over of the sealing ring is made more difficult as a result.

In accordance with one refinement of the invention, a reinforcement section which extends radially to the outside joins the fastening section. Said reinforcement section is part of the carrier element. The reinforcement section makes it possible that the sealing ring is additionally stiffened, and folding over of the sealing ring is made more difficult at the same time. Furthermore, the pressure of the sealing ring on the first bearing part is improved.

In accordance with one refinement of the invention, the reinforcement section is of L-shaped configuration. That is to say, an L-shaped section adjoins the fastening section directly. Said L-shaped section can be configured by way of a right-angled bend of the carrier element in said region. Any other shapes are also conceivable.

The first bearing part may have a depression on the outer circumference. A conically widening region adjoins said depression. The depression is preferably provided in a region, in which the fastening section of the carrier element merges into the reinforcement section. The first bearing part widens conically in a manner which adjoins the depression. A configuration of this type once again increases the pressure of the sealing ring on the seat, and additionally ensures that the sealing ring comes into full surface area contact with the outer circumference of the first bearing part.

One embodiment provides that the elastic element configures a collection channel. It is an advantage of this that the dirt or water which has penetrated into the seal arrangement can be collected in the collection channel and at the same time, by way of circumferential discharge in the collection channel the seal arrangement, can leave the seal arrangement again through an annular gap which is positioned upstream of the collection channel and by way of a following opening which is provided.

In accordance with one embodiment, a contact element is connected to the second bearing part, and at least one sealing lip of the elastic element is in sliding contact with the contact part.

At least one sealing lip of the elastic element is preferably in sliding contact with the second bearing part and/or the wheel bearing flange.

BRIEF DESCRIPTION OF THE DRAWINGS

In the following text, two exemplary embodiments of the invention will be shown using three figures, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
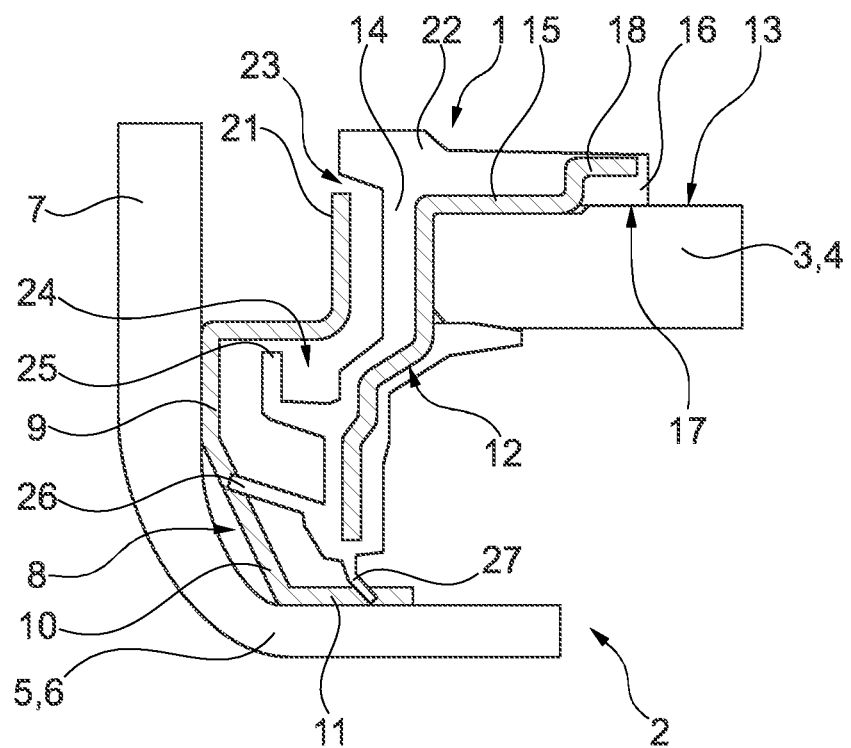
FIG. 1 shows a partial longitudinal section of a seal arrangement according to one embodiment of a wheel bearing.

FIG. 1 shows a longitudinal section of a seal arrangement 1 of a wheel bearing 2 (merely details of which are shown) having a first bearing part 3 which is configured as an outer ring 4 and, in the installed state, is connected to a wheel support (not shown). Furthermore, a second bearing part 5 is provided which configures the inner ring 6. The second bearing part 5 has a wheel bearing flange 7 which is connected in one piece. Rolling bodies (not shown) are guided between the first bearing part 3 and the second bearing part 5.

The seal arrangement 1 of the wheel bearing 2 comprises a contact element 8 which is configured as a preliminary seal and is preferably manufactured from a metallic material. The contact element 8 has a contact piece 9 which produces a water-tight closure with the second bearing part 5. A conical connecting piece 10 connects the contact piece 9 to a hollow-cylindrical fastening piece 11 which is fixed by means of a press fit, in particular, in its axial position, in order not to undermine the water-tight contact of the contact piece 9.

Furthermore, a carrier element 12 is provided which is fastened to the outer circumference 13 of the first bearing part 3 by means of a press fit. An elastic element 14 or elastic body is provided on the carrier element. Furthermore, the carrier element has a fastening section 15 for fastening to the first bearing part 3. In order to avoid pitting corrosion below the fastening section 15, what is known as a static seal is formed via a sealing ring 16 which is integrally formed on the elastic part 14.

The sealing ring 16 has a cylindrically circumferential face 17 which bears against the outer circumference 13 of the first bearing part 3. The fastening section 15 is adjoined by a reinforcement section 18 which extends radially to the outside and stiffens the sealing ring 16. The reinforcement section 18 is formed by way of a right-angled bend of the carrier element 12.

Figure 2:
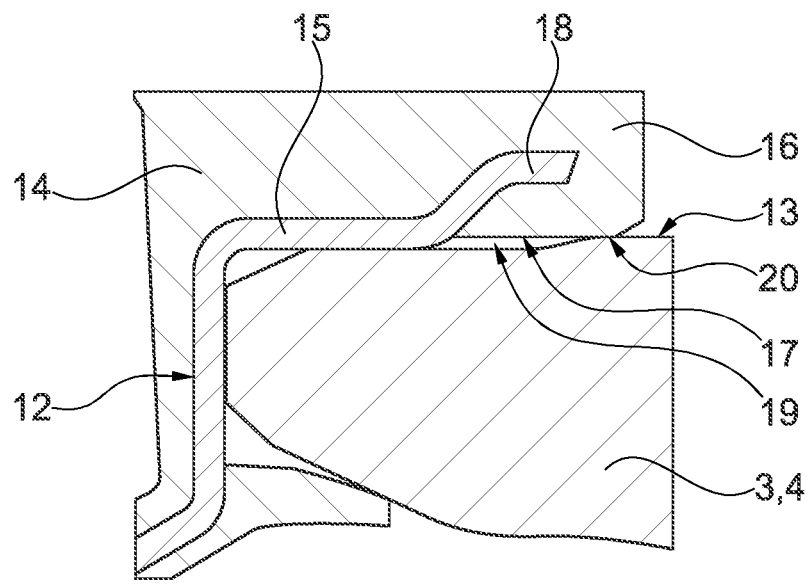
FIG. 2 shows an enlarged detail of the seal arrangement of FIG. 1 in accordance with a first embodiment.

In addition, it can be seen from FIG. 2 that the first bearing part 13 has a depression 19 on the outer circumference 13; and that a conically widening region 20 adjoins the depression, the sealing ring 16 bearing over the full surface area against the conically widening region 20.

An opening 23 is configured between an end piece 21 of the contact element 8 and a projection 22. The fact that the opening 23 is oriented axially in the direction of the wheel bearing flange 7 can advantageously avoid water which flows in radial directions penetrating into the seal. The projection 26 is advantageously formed in such a way that it has the greatest outer radius of the seal arrangement, whereby dirty water can drip off it in the downward direction. Furthermore, it also covers an annular gap which opens into a collection channel 24. The collection channel 24 is formed by way of a contactless axial sealing lip 25 of the elastic element 14, the end of which sealing lip 25 is directed toward the outside in the radial direction.

In order that the elastic part 23 can assume as many functions as this, it extends from the axial end of the reinforcement section 18 as far as the radially inner end of the carrier element 12, said elastic part 23 covering the carrier element 12 radially to the outside and being arranged axially between the contact piece 9 and the carrier element 12. As an alternative, the respective functions can also be carried out by elastic parts which can be attached separately, but this leads to an increased manufacturing complexity.

Furthermore, the seal arrangement 1 has an axial sealing lip 26 and a radial sealing lip 27 which form a sliding sealing contact together with the contact element 8.

Figure 3:
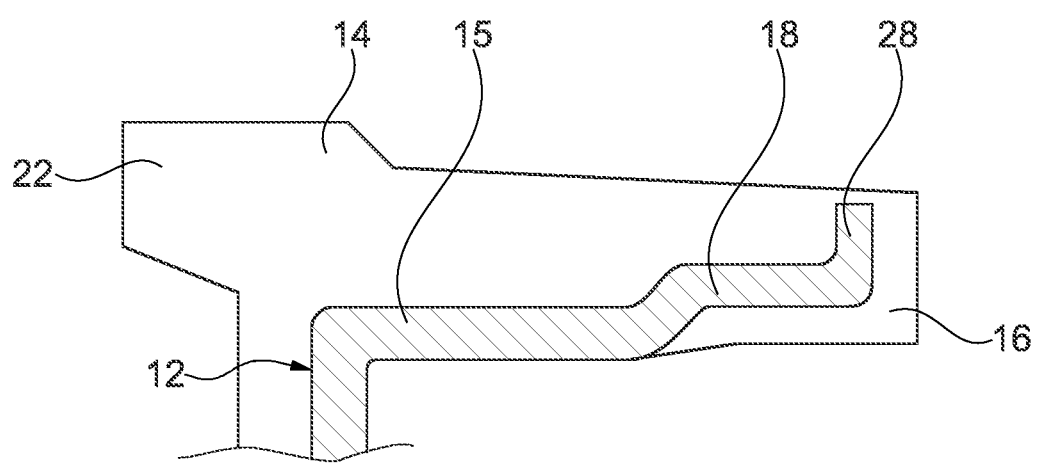
FIG. 3 shows an enlarged detail of the seal arrangement of FIG. 1 in accordance with a second embodiment.

FIG. 3 shows a second exemplary embodiment of the invention. FIG. 3 represents the same detail as FIG. 2. Identical parts are denoted by way of the same designations as in the preceding figures.

The difference from the preceding figures lies in the configuration of the reinforcement section 18. The reinforcement section 18 once again has a right-angled bend, and extends with a section 28 radially to the outside.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF DESIGNATIONS

1 Seal arrangement
2 Wheel bearing
3 First bearing part
4 Outer ring
5 Second bearing part
6 Inner ring
7 Wheel bearing flange
8 Contact element
9 Contact piece
10 Connecting piece
11 Fastening piece
12 Carrier element
13 Outer circumference
14 Elastic element
15 Fastening section
16 Sealing ring
17 Circumferential face
18 Reinforcement section
19 Depression
20 Conically widening region
21 End piece
22 Projection
23 Opening
24 Collection channel
25 Sealing lip
26 Axial sealing lip
27 Radial sealing lip
28 Section

The invention claimed is:

1. A seal arrangement of a wheel bearing comprising a first bearing part and a second bearing part which is connected in one piece to a wheel bearing flange, between which bearing parts rolling bodies are guided, the seal arrangement having a carrier element which is connected to the first bearing part, and an elastic element being provided on the carrier element, the elastic element having at least one sealing lip, and the carrier element having a fastening section which is connected to an outer circumference of the first bearing part, a sealing ring which forms a seal of the fastening section being integrally formed on the elastic element, wherein the sealing ring has a cylindrically circumferential face which bears against the outer circumference of the first bearing part; wherein the carrier further comprises a reinforcement section located within the elastic element extending from the fastening section, the reinforcement section including a radially-extending portion extending from the fastening portion, and an axially-extending portion extending from the radially-extending portion within the elastic element to reinforce the sealing ring adjoining the fastening section.

2. The seal arrangement as claimed in claim 1, wherein the reinforcement section being of L-shaped configuration.

3. The seal arrangement as claimed in claim 1, wherein the first bearing part has a depression on the outer circumference.

4. The seal arrangement as claimed in claim 3, further comprising a conically widening region adjoining the depression.

5. The seal arrangement as claimed in claim 1, wherein the elastic element provides a collection channel.

6. The seal arrangement as claimed in claim 1, further comprising a contact element being connected to the second bearing part, and wherein at least one of the at least one sealing lip of the elastic element being in sliding contact with the contact element.

7. The seal arrangement as claimed in claim 1, wherein at least one of the at least one sealing lip of the elastic element being in sliding contact with the second bearing part and/or the wheel bearing flange.

8. A seal arrangement for a wheel bearing, the seal arrangement comprising:
an outer ring;
an inner ring connected in one piece to a wheel bearing flange and spaced from the outer ring to define a guide for a plurality of rolling bodies;
a carrier having a fastening section connected to an outer circumference of the outer ring;
an elastic body provided on the carrier, the elastic body having at least one sealing lip; and
a sealing ring forming a seal of the fastening section and being integrally formed on the elastic body, wherein the sealing ring has a cylindrically circumferential face which bears against the outer circumference of the outer ring;
wherein the carrier includes a reinforcement section extending from the fastening section and located within the elastic element, the reinforcement section including a radially-extending portion extending from the fastening portion, and an axially-extending portion extending from the radially-extending portion within the elastic element to reinforce the sealing ring adjoining the fastening section.

9. The seal arrangement as claimed in claim 8, wherein the reinforcement section has an L-shaped configuration.

10. The seal arrangement as claimed in claim 8, wherein the outer ring has a depression on the outer circumference.

11. The seal arrangement as claimed in claim 10, wherein the outer ring has a conically widening region within the depression.

12. The seal arrangement as claimed in claim 8, wherein the elastic body provides a collection channel.

13. The seal arrangement as claimed in claim 8, further comprising a contact body being connected to the inner ring, and wherein at least one of the at least one sealing lip of the elastic body is in sliding contact with the contact body.

14. The seal arrangement as claimed in claim 8, wherein at least one of the at least one sealing lip of the elastic body is in sliding contact with the wheel bearing flange.

* * * * *